(No Model.)
J. H. GUNN.
VEHICLE SPRING.
No. 462,873.　　　　　　　　Patented Nov. 10, 1891.
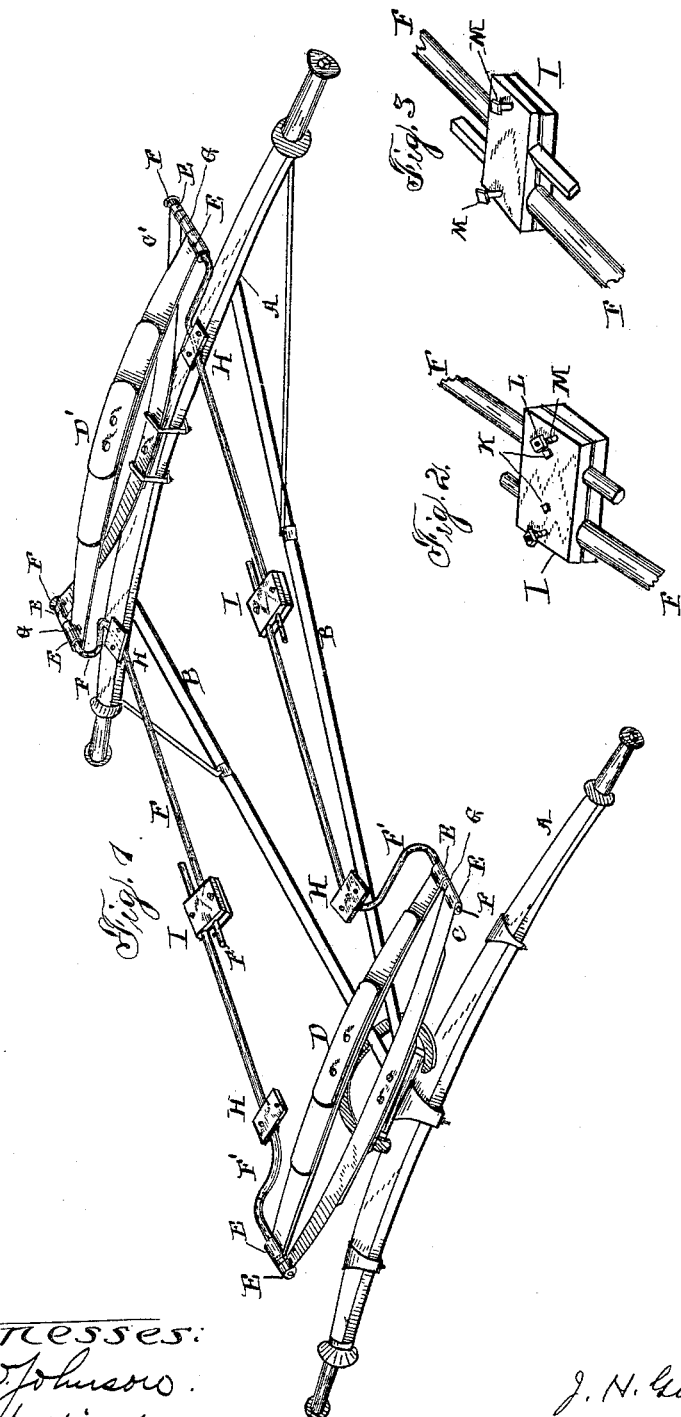

UNITED STATES PATENT OFFICE.

JOSEPH H. GUNN, OF McLEAN, NEW YORK.

VEHICLE-SPRING.

SPECIFICATION forming part of Letters Patent No. 462,873, dated November 10, 1891.

Application filed November 13, 1890. Serial No. 371,368. (No model.)

*To all whom it may concern:*

Be it known that I, JOSEPH H. GUNN, residing at McLean, in the county of Tompkins and State of New York, have invented certain new and useful Improvements in Vehicle-Springs, of which the following is a specification, reference being had therein to the accompanying drawings.

This invention relates to springs for vehicles.

The object of the invention is to improve the spring shown in my patent, No. 361,938, of April 26, 1887.

Figure 1 is a perspective of the axles and springs of a vehicle with box removed. Fig. 2 is a perspective of the clamping-box and ends of torsion-rods. Fig. 2 is a bottom perspective of a modification of the same.

A A indicate the axles of a vehicle, which are connected by reach B B of any usual construction. The lower leaves C C' of the springs are connected to the axles or bolsters in any usual or suitable way. The upper leaves D D' of the elliptical springs support the carriage box or body, as is usual. The semi-elliptical springs C C' and D D' have loops E E at their ends and the loops of each pair are in alignment. Rods F pass through the loops of each spring, thus coupling the springs so that the parts C and C' and D D' form in effect elliptical springs; but the upper half of each spring is in a different vertical plane from the lower half.

The washers or sleeves G may be placed between the proximate sides of the loops E to prevent chafing of the springs.

The rods F bend inwardly toward the carriage-body and then bend in the direction of the length of the body, passing through bearing-boxes H, which are secured to the bottom of the body in any suitable manner. So far the device is in the main like that described in my patent referred to.

The rods F are continued from the boxes or bearings H lengthwise of the body of the carriage and are free to turn in said boxes H. About midway of the carriage-body I place clamping-boxes I. These clamping-boxes receive the ends of the rods F F, as shown.

The boxes I are secured to the bottom of the carriage-body, preferably about midway thereof. The bearings for shafts F in boxes I may be oval or polygonal, and the ends of rods F may be of corresponding cross-section, as in Fig. 3, or the rods may be round and be held in the boxes by set-screws K when it is desirable that the rods be not allowed to rock in the boxes I.

By clamping the ends of rods F tightly in boxes I the rods will not be permitted to turn in said boxes; but as the outer ends of these rods must rise and fall with the springs the portion F' of the rods between the loops of the springs and the boxes H act as cranks or levers to twist the rods between boxes H and I. The torsion of rods F thus acts to assist the springs.

When it is not desired that the rods F shall act by torsion, the set-screws K may be loosened, or the leaves of boxes I may be loosened from each other by loosening nuts L on bolts M, which bolts hold the box-sections together and may hold them to the wagon-body. When thus loosened, the rods F do not act by torsion, but rock in their bearings substantially as in my old patent. By this device it is practicable to graduate the springs according to the load to a considerable extent.

The boxes I may be made to embrace only one rod F, if desirable. A number of mechanical means for clamping or loosening the rods F will readily suggest themselves.

What I claim is—

1. The lower leaves of the springs supported on the axles and having loops at their ends, the upper leaves also having loops and sustaining the carriage-body, a rod passing through each pair of loops at the ends of the springs, then bent in toward the body, and thence extending lengthwise of the body through bearing-boxes on said body, and clamping-boxes near the median line of the body in which the rods are held, all in combination, substantially as described.

2. The combination of the semi-elliptic springs having loops at their ends and supporting the body, as described, the rods passing through said loops, said rods bent inward from the spring to the body, thence extending lengthwise of the body through bearings and toward the median line of the body, and adjustable clamp-plates near the middle of the body embracing the proximate ends of the rods at each side of the body, all in combination, substantially as described.

In testimony whereof I affix my signature in presence of two witnesses.

JOSEPH H. GUNN.

Witnesses:
FRED H. SANFORD,
CHARLES A. HART.